VOICE-OPERATED SYSTEM

Filed July 1, 1949 4 Sheets-Sheet 1

INVENTORS: K. H. DAVIS
R. K. POTTER
BY Harry C. Hart
ATTORNEY

Nov. 20, 1951 K. H. DAVIS ET AL 2,575,909

VOICE-OPERATED SYSTEM

Filed July 1, 1949 4 Sheets-Sheet 2

INVENTORS: K. H. DAVIS
R. K. POTTER
BY Harry C. Hart
ATTORNEY

Nov. 20, 1951 K. H. DAVIS ET AL 2,575,909

VOICE-OPERATED SYSTEM

Filed July 1, 1949 4 Sheets-Sheet 3

INVENTORS: K. H. DAVIS
R. K. POTTER

BY Harry C. Hart

ATTORNEY

INVENTORS: K. H. DAVIS
R. K. POTTER
BY Harry C. Hart
ATTORNEY

Patented Nov. 20, 1951

2,575,909

UNITED STATES PATENT OFFICE 2,575,909

VOICE-OPERATED SYSTEM

Kingsbury H. Davis, Bernardsville, and Ralph K. Potter, Madison, N. J., assignors to Bell Telephone Laboratories, Incorporated, New York, N. Y., a corporation of New York Application July 1, 1949, Serial No. 102,506

22 Claims. (Cl. 179—16)

The present invention relates to voice-operated systems and more particularly to the control of electrical or mechanical apparatus by automatic means which responds to a vocal utterance by a calling telephone subscriber such as his pronouncement of the desired telephone number.

A principal object of the invention is to remove the dependence of such a system on the particular characteristics of an individual voice. A particular object is to remove the dependence of the system on the frequency characteristics peculiar to individual voices. Another particular object is to free it from dependence on particular time characteristics of an individual voice such as the talking speed, the amount of elision from word to word and the pauses by which the speech may be punctuated.

A general object is to improve the speed and certainty with which an operation is carried out in response to the caller's voice.

A noteworthy advance was made in the art of voice-operated control mechanisms by H. W. Dudley who describes, in United States Patent 2,238,555, apparatus, partly electrical and partly mechanical, which operates to establish a telephone connection when a particular individual calling party speaks to it in a voice having certain standard characteristics for which the apparatus is designed, a sequence of preselected words, for example, the English words "one," "two," . . . "nine," "oh," which stand for the first ten digits of our number system. While reference must be made to Dudley's patent for the details of his system, its operation may be briefly described as follows: The voice, a highly complex sound, is first broken down into its various component frequencies by a bank of filters. Each of the several filters is coupled to a rod by way of a solenoid, and the several rods are arranged in a row. The output of each filter thus causes an axial displacement of one of the rods. When the filter outputs are distributed in a certain way, corresponding to a certain phonetic element of the voice, the rods thus adopt a certain geometrical arrangement; and in this arrangement a group of slots which have been precut, one in each of the rods, are found to be in alignment. Under this condition a test bar can and does fall into the slots. This action constitutes a recognition of the presence of a certain phonetic element in the voice, and by means of a set of relays the presence of this element is registered. The voice, of course, is changing at the normal syllabic rate so that the configuration of the rods will have changed by the next "test" instant. If in the course of this change the distribution of the filter outputs, and thus the configuration of the rod array, has become one which corresponds to another phonetic element, then another group of slots, similarly precut in the rods of the array, will find themselves in alignment, and another test bar falls into them. This constitutes a recognition of the presence of this second phonetic element, and its presence is similarly recorded by way of the relays.

Dudley now provides a second array of rods, one for each phonetic element; and these rods are likewise provided with precut slots. The recording of the presence of particular phonetic elements operates, by way of the relays, to move the corresponding phonetic element rods into positions in which they define a particular configuration; and in this configuration the slots corresponding to a particular word are in alignment and a "word" test bar falls into them and the occurrence of the word is registered.

Thus Dudley proceeds on the understanding that every word to be recognized may be regarded as being composed of a particular sequence of discrete, defined phonetic elements each of which is in turn the consequence or result of a particular distribution among the outputs of his several filters.

Herein lies a weakness of Dudley's system. It is evident that no speech sound jumps discontinuously from one phonetic element to another. Rather, it changes more or less rapidly but nevertheless continuously, through its course. Furthermore any system which is uniquely based on the frequency distribution of the voiced sound is inevitably restricted to operation with a standard voice. If tailored to operate correctly with the voice of a man, for example, it will inevitably fail with a woman's voice, though she speak the same language, with the same accent and inflection and at the same speed.

Accordingly, specific objects of the present invention are to overcome the shortcomings of the system of the Dudley patent. To this end the sound of each word is examined continuously from the instant of its inception to its termination, and continuously compared with a standard signal representative of a standard reference pronouncement of the word. If a continuous match results between the "unknown" and the "standard" from the inception of the spoken word to its completion, a signal is generated which is stored until a required number of such signals are at hand, whereupon the stored signals operate appropriate selector mechanisms to establish the telephone connection indicated by the words spoken by the calling party. In one embodiment, the signal representing the standard word is generated by a special beam tube provided with a mask pierced by apertures arranged in a space pattern conforming to the energy distribution of the spoken word in frequency-time coordinates. The beam scans rapidly and repeatedly in the frequency dimension over a part of this mask which represents an instantaneous sample of the standard spoken word, and only when a corresponding instantaneous sample of the "unknown" spoken word matches the resulting signal does the beam advance along the mask in the time dimension to a new instantaneous sample of the standard word. Thus, it is a feature of this embodiment that the speed at which the "unknown" word is spoken governs the speed at which the sample is presented for comparison.

It is a fact that the brain has a remarkable power of disregarding irrelevant differences among the sensations which it receives, and of focusing its attention on the significant differences. It will be recalled that two photographs of the same scene, one with high contrast and the other with low, a large one or a small one, are immediately recognized by the brain as representing the same scene, despite the fact that from the optical viewpoint they differ widely. Similarly the same word spoken loudly or softly, rapidly or slowly, in a high key or in a low key, are widely different physical phenomena though the idea for which they stand as symbols is recognized by the brain to be the same. The brain is able to disregard wide differences in contrast, in energy level, in pitch, and the like, and focus attention on the significant differences. This ability of the brain is not shared by physical mechanisms, and accordingly provision must be made in any system such as the present one to remove or obscure, so far as possible, irrelevant differences among the phenomena which are to be compared. This provision is made, in accordance with the invention, by normalizing the unknown to conform as far as possible with the standard in all respects except the significant ones. The invention provides for normalization of the signal representing the spoken word in time, in energy level, and in the absolute location, on the frequency scale, of the voice resonances. The normalization process may be carried out by applying an appropriate modification to the unknown, to the standard, or to both, the choice being largely a matter of instrumentation. In the embodiment to be described it is applied sometimes to one, and sometimes to the other.

The process by which the speed with which the voiced word is uttered governs the speed with which the standard is presented for comparison is the first instance of such normalization, and amounts to normalization of the voice in time.

As a further feature, and as another instance of the normalizing process, the standard signal is operated in a fashion which makes it independent of another irrelevant characteristic of the voice. For example, if the telephone number "five, three, four, two, seven" is spoken into a telephone transmitter it is irrelevant to the automatic switching problem whether the speaker is a man, a woman, or a child; yet it is an unquestioned fact that the differences in the physical characteristics of the same word as spoken by three such individuals are considerable. In accordance with the invention such irrelevant characteristics of the voice are deliberately obscured prior to matching it against the standard; and this may be done by applying a suitable modification to the standard.

Recent work on the analysis of speech shows that by a suitable transformation of coordinates, the diagram showing the speech energy, as a function of frequency and time, for the same word as spoken by different speakers, for example a man, a woman, and a child, have closely similar forms or shapes, though the individual resonances may occur at quite different frequencies, and that the necessary transformation is a quasi-logarithmic one. This discovery is implemented, in accordance with the invention, by scanning the standard mask, not at a single unvarying rate, but at different rates which are correlated respectively with the man's voice, with the woman's, and with the child's. Each of these scans may itself be carried out at a non-uniform speed, though for practical purposes uniform speed scans are thought to be adequate, when their individual speeds are properly adjusted, to effect the necessary coordinate transformation with sufficient accuracy to enable the apparatus to operate correctly.

In accordance with another feature of the present invention, and still another instance of the normalizing process, the wide though irrelevant differences in energy level between the signals representing a given word as spoken by various voices, and between any one of them and the reference voice, are obscured by an amplitude-normalizing process. Apparatus is provided which operates, before the comparison is made, to adjust the energy levels of the unknown end of the standard until they are alike, whereupon the comparison which is made by the matching device is freed of obscuration by irrelevant energy level differences among them. This amplitude-normalizing apparatus may comprise variable-gain amplifiers whose gain is adjusted by feedback of a derived short-time average signal.

Of course, no two pronouncements of the same word have energy distributions which are absolutely identical in every particular. Their energy distributions differ even in the case of repetitions by a single speaker, but especially in the case of utterances by different speakers. Thus a certain tolerance is called for in the process of matching the "unknown" against the standard. With the apparatus of the present invention the requisite amount of tolerance is conveniently introduced into the system by adjustment of a threshold in a recognition unit to embrace slightly different pronouncements and to recognize them as different only in irrelevant detail.

The invention will be illustrated as applied, in a preferred embodiment, to a telephone switching system, and it will be fully apprehended from the following detailed description taken in connection with the appended drawings, in which.

Figure 1:
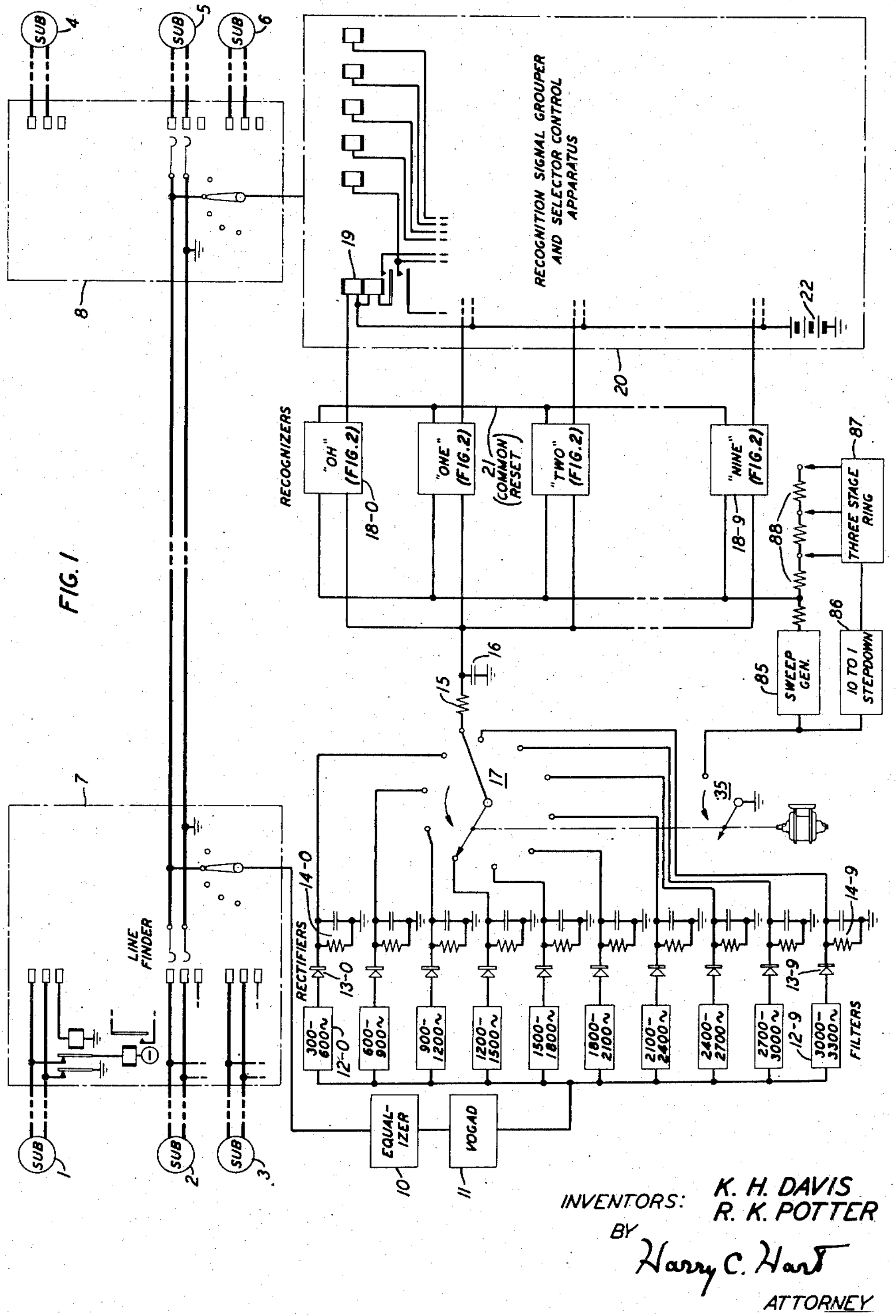
Fig. 1 is a schematic block diagram of voice-operated automatic telephone switching apparatus.

Referring now to the drawings, Fig. 1 is a schematic diagram showing a telephone system in which the vocal pronouncement by any one of a group of calling subscribers 1, 2, 3 of a group of words, e. g. digits, representing the number called, operates the proper switches to establish the connection to the desired called subscriber 4, 5, or 6. The apparatus designated by the boxes 7, 8, is standard equipment in present finger-dial telephone systems. The voice signals originating with any one of the calling subscribers are switched by this equipment, which may include a conventional line finder, into the "Voice-Dialing" equipment, shown in the lower part of the figure as soon as, or soon after, the calling subscriber takes his receiver off the hook.

The speech signals, consisting, for example, of a sequence of spoken words such as the English equivalents of digits selected from the digit series "0," "1," through "9," are transmitted through an equalizer 10 and a vogad 11 and are then separated into frequency bands by band-pass filters 12—0 to 12—9. The function of the equalizer 10 is to adjust the distribution of the speech energy on the frequency scale to any desired characteristic, the generally accepted characteristic being one which deemphasizes the lower frequency (300 cycles per second) part of the speech band by about 30 decibels as compared with the higher frequency portion (3,300 cycles per second). The vogad 11 serves to adjust the volume of incoming speech to a constant output level, its adjustments being slow compared with the syllabic rate, so as to avoid the introduction of spurious frequencies into the analyzing filters 12. The output of each of the several filters 12 is then rectified by a diode 13 and smoothed by an integrating circuit 14. The signals resulting from this process are then applied in succession through a resistor 15 to a sample-storage condenser 16, by means of the high speed commutator 17. This commutator is shown for the sake of simplicity as a mechanical rotary switch, but an electrical equivalent such as an electronic ring circuit may be employed as a practical matter. Across the condenser 16 there is obtained the spectrum of a brief sample of the speech energy, the spectrum changing as the speech energy changes its frequency distribution in the course of the pronouncement of the digits.

The spectrum of the speech energy is now introduced into a group of digit recognizers 18—0 to 18—9 which will be described in detail with reference to Fig. 2. The input terminals of these recognizers 18 are all connected in parallel and supplied with the voice spectrum signal stored on the sample-holding condenser 16. By methods to be described, each recognizer 18 compares this spectrum, as it changes, with a spectrum stored within it in the form of a space pattern representating the digit which is assigned to it as spoken by a reference voice at a standard speed. If the word spoken by the calling subscriber is within the assigned vocabulary, one of these recognizers will find that a given spoken digit as analyzed matches its stored pattern sufficiently well for acceptance, and this is signified by the operation of a storage relay 19 included in recognition signal grouper and selector control apparatus 20 and assigned to that particular recognizer. Sequential operation of a group of the relays 19 acts, precisely as it does in Gosmann Patent 2,293,203 and in Dudley Patent 2,238,555, as by grounding one to three of a set of five conductors extending therefrom to the right-hand part of the apparatus, to selectively operate the relays of a register thereof in the manner described in R. Raymond et al. Patent 1,862,549. At the moment of recognition of a digit, a "common reset" conductor 21 is energized in such a way as to erase all the effects of partial recognition in any or all of the other recognizers 18 of the group, thereby resetting them to their initial condition, ready to attempt a matching of the next spoken digit to follow. As soon as all of the digits of the called number are stored in the selector control apparatus 20, the telephone connection to the called subscriber 4, 5, or 6 is completed by standard apparatus, and the entire voice dialing equipment is made ready by conventional apparatus forming parts of the boxes 7, 8 to receive and recognize a new called number.

Figure 2:
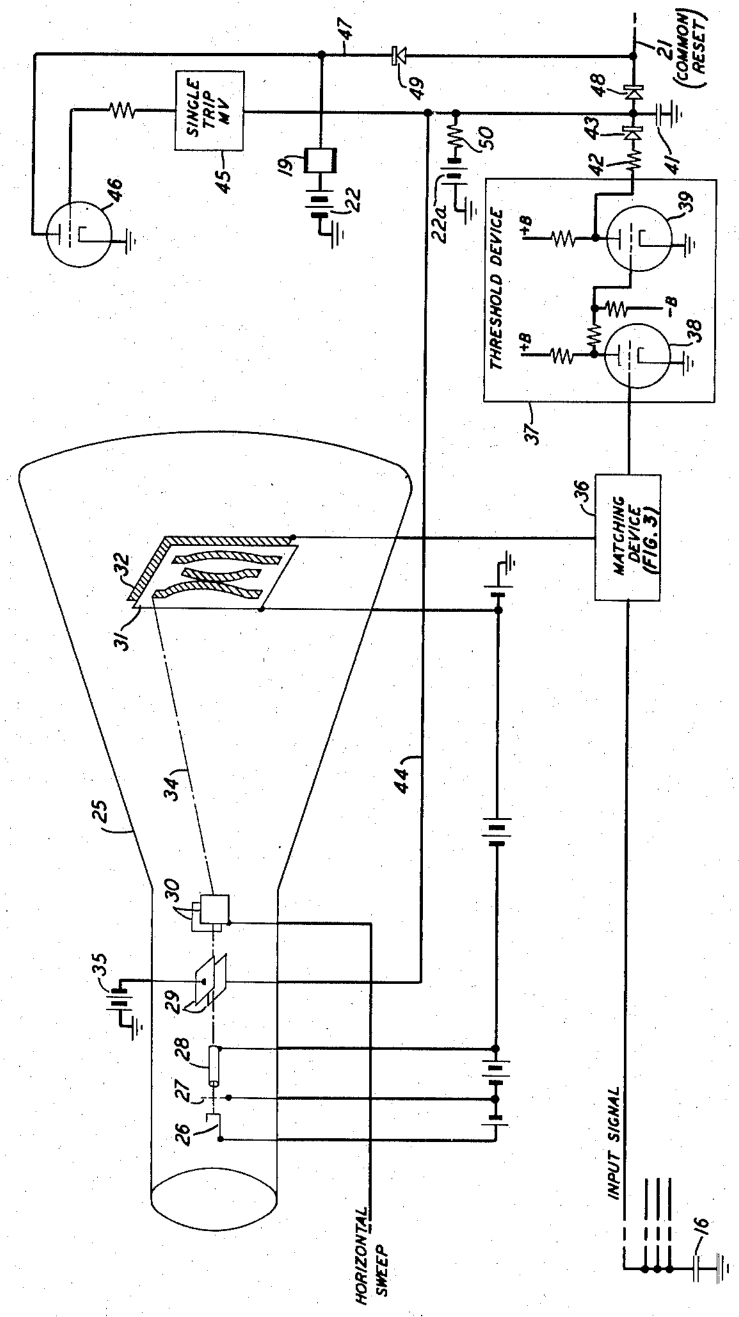
Fig. 2 is a schematic diagram of word-recognizing apparatus for use in the system of Fig. 1.

Fig. 2 shows one form of recognizer in detail. It comprises a cathode ray tube which contains an electron gun 26—28, vertical deflecting elements 29, horizontal deflecting elements 30, a mask 31, which bears a space pattern of perforations representing the particular stored digit which is assigned to the recognizer, a target 32 which receives the beam electrons which pass through the perforations of the mask 31 and so translates the space pattern of the perforations into a current time pattern, and a matching network 36 which compares this current time pattern with that of the incoming spectrum of the spoken digit, as it appears on the condenser 16. The electron beam 34 of the cathode ray tube 25 is arranged to be swept horizontally across the perforated mask 31, the sweep voltage being triggered by the contactor 35 shown in Fig. 1. This contact is shown as mechanically coupled to the shaft of the commutator 17 and thus the horizontal sweep of the beam 34 occurs once for each revolution of the commutator 17. Electronic means for accomplishing this synchronization, when an electronic commutator such as a ring circuit is employed, are well known. At the start of a spoken digit, that is, after the reset operation above referred to has been completed, the vertical position of the beam 34 is such that the horizontal sweep is along the uper edge of the perforated mask 31, and the voltage of the vertical deflection bias battery 35 is adjusted accordingly. The holes in the mask permit electrons of the beam to pass through it and impinge on the target 32 directly behind the perforated mask 31, giving rise to a current in the output of this target which constitutes a standard signal, hereinafter termed $y$. The density of perforations is so controlled in the fabrication of the mask 31 that the number of electrons striking the target is proportional to the variations in the spectrum of an incoming signal at the initial part of the pronouncement of the digit in question by a standard voice. The mask may be fabricated by conventional photoengraving techniques, using a thin plate to start with and prolonging the etching process until the etchant has eaten through the full thickness of the plate in spots. The incoming signal $x$ and the standard signal $y$ are then introduced into a matching device 36 which will be described in detail with reference to Fig. 3. If these two spectra, the analyzed incoming signal $x$ and the standard signal $y$, match over several horizontal sweeps of the beam 34, the matching device 36 is arranged to apply a high positive voltage to a threshold device 37. The threshold device 37 may comprise two or more triode vacuum tubes 38, 39 in tandem, with biases so arranged that a small increase in voltage applied to the grid of the first triode 38 is amplified by a very large factor and appears on the anode of the second triode 39 as a change from saturation (very low voltage, e. g., about 10 volts above ground) to cut off (high voltage, nearly equal to +B). By the use of vacuum tubes of high transconductance, it is a simple matter to arrange that a grid swing of 3 volts shall cause the output voltage to change from +10 to +200 volts. This swing to +200 volts occurs whenever the matching circuit 36 finds a sufficiently good match between the signal $x$ and the signal $y$. This high positive voltage now begins to charge a condenser 41 through a resistance 42 and a diode rectifier 43. The voltage across the condenser 41 is applied by way of a conductor 44 to the vertical deflecting elements 29 of the beam tube 25 and operates to deflect the cathode beam 34 downwardly. The effect of this downward deflection is to cause the beam to sweep over a new part of the standard space pattern on the mask 31 and so to generate an output current time pattern which changes as the signal x changes. The effect of the diode rectifier 43 is to permit the condenser voltage to remain constant when the threshold circuit 37 next saturates. The perforated mask 31 therefore has what may be termed an elastic time axis in the vertical direction. The density of the perforations lying in the path of the beam 34 varies as the beam is deflected downward, in just the manner that the spectrum of some one of the spoken digits is expected to vary. The length of the target in the downward direction is immaterial because the beam is deflected rapidly downward as long as a match occurs, but is immediately stopped as soon as it gets further down than the spoken digit has progressed, or as soon as it discovers that subsequent parts of the spoken digit do not fit the standard; in other words, that the spoken digit is not the one for which the particular mask is the standard. This presumes an available downward sweep which is faster than the fastest occurrence of any spoken digit, all the feedback control being exerted to retard it to a speed at which the signal $y$ continues to match the signal $x$.

When the beam has been deflected to the foot of the perforated mask, the voltage on the condenser 41 has reached a preassigned value which is sufficient to trip a single-stroke multivibrator 45 which may be of conventional construction. The output pulse of this multivibrator is applied to the grid of a triode 46 as a positive voltage and reduces its internal impedance to a low value, whereupon a spurt of current flows from the battery 22 through the relay 19 in the selector control apparatus 20 (Fig. 1), the tube 46, and to ground, thus operating the relay 19 and pulling the potential of the recognition signal conductor 47 from +B to +10 volts above ground for a short period. This biases rectifiers 48 and 49 into their low resistance conditions, and allows the condenser 41 to discharge. At the same time the sudden, brief reduction of the potential of the recognition signal conductor 47 and of the condenser 41 to +10 volts is applied by way of a common reset conductor 21 to the several condensers 41 of the various recognizers, thus resetting all of them when a word recognition is accomplished by any one of them. The effect of the two rectifiers with the common reset lead connected between them is to prevent the common reset voltage from also operating all of the recognition relays.

When a match, after starting, fails to proceed, whether due to the fact that the incoming signal $x$ is not suitable for matching with the locally generated signal $y$, or because the calling subscriber has paused in his speech or for any other reason, the condenser 41 will have accumulated a voltage of a certain magnitude between +10 volts and the voltage which is sufficient to trip the multivibrator 45. This voltage applied to vertical deflecting elements 29 holds the cathode beam 34 at a certain height along the mask 31. Any gradual change in the voltage of the condenser 41 will alter the location of the beam on the mask. If the condenser voltage should increase the beam will advance downward along the mask and if it should decrease the beam will drift backward or upward along the mask toward its starting point. Evidently any leakage of the charge from the condenser will result in such a change in voltage.

Therefore, in order to avoid any possible skipping of any part of the standard signal during such intervals of no match, it is important that the cathode beam 34 not drift downward and therefore that the condenser voltage not be increased by leakage. The optimum arrangement is one in which the beam remains at whatever height along the mask it has reached in the course of the matching process. But because the back resistances of the diodes 48 and 49 cannot be made infinite, a small amount of positive leakage may occur from the relay battery 22 and through these back resistances. A convenient way to avoid any possible downward drift of the beam is by compensating any possible positive leakage of the condenser charge from the battery 22 by way of the relay 19 and the back resistances of the diodes 48 and 49. This in turn may be accomplished by providing a leakage path to a potential point of opposite polarity and by way of a resistance of comparable but slightly less magnitude. Thus a resistor 50 is connected from the condenser 41 to the negative terminal of a battery 22*a* whose positive terminal is grounded and whose electromotive force is the same as that of the battery 22, for example, 200 volts. The resistance of the resistor may be adjusted to such a value that the residual leakage is slightly negative.

Figure 3:
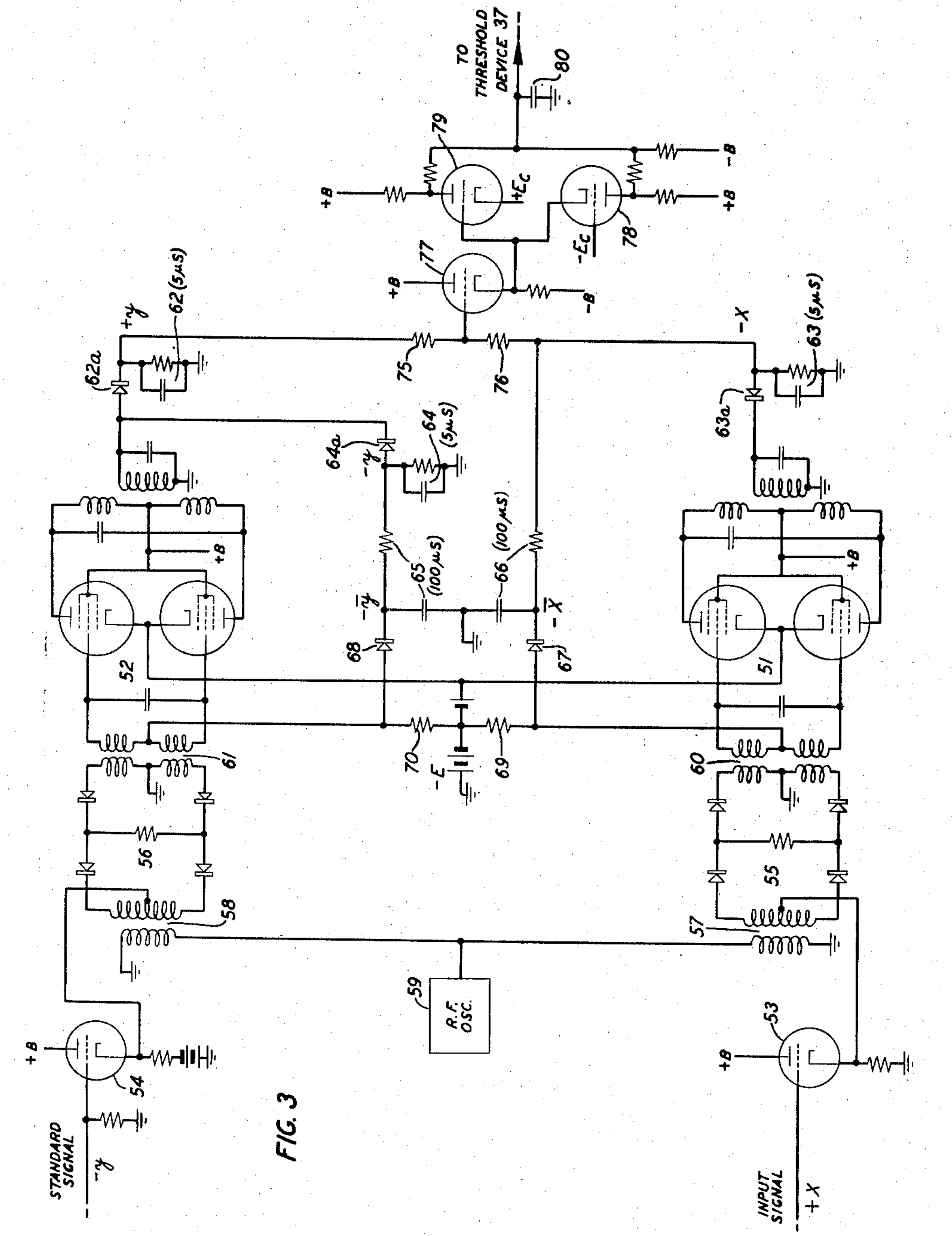
Fig. 3 is a schematic circuit diagram of matching apparatus for use in the apparatus of Fig. 2.

Fig. 3 shows the connections of a suitable matching device in detail. It comprises variable gain amplifiers 51, 52 whose function is to adjust the average values $\bar{x}$, $\bar{y}$, of the signals $x$, $y$ to the same constant value. The instantaneous values of $x$ are then subtracted from the instantaneous values of $y$ in a subtracting circuit. The following circuit, comprising three triode vacuum tubes 77, 78, 79 constitutes a squaring device followed by an integrator, so that the output consists of a voltage proportional to $\overline{(y-x)^2}$, the average value of the squares of the instantaneous differences of $x$ and $y$. This function is known to measure the excellence of the fit between two varying quantities or functions when their average values are the same and constant.

The analyzed incoming signal $x$ and the standard signal $y$ are passed through cathode follower vacuum tubes 53, 54, which serve as low impedance sources of current. The cathode circuit of the upper tube 54 is returned to a point of negative potential, furnished by a battery, in order to permit it to pass the signal from the target 32 which, because it originates with the electron beam 34, is of negative polarity. These output currents are then passed through variolosser circuits 55, 56 in such a way that increase of $x$ or of $y$ increases the current through the variolosser elements and thus reduces the transmission loss of the variolosser to a radio frequency voltage which is introduced into each variolosser by transformers 57, 58 and from a common radio frequency source 59. The outputs from the variolossers are then introduced by way of transformers 60, 61 into the radio frequency amplifiers 51, 52. These amplifiers are preferably characterized by a gain which varies sharply with small changes in grid voltage. They may comprise, for example, variable mu pentode vacuum tubes whose gain is controllable by the amount of grid bias applied to the center taps of the grid driving transformers 60, 61. Any desired amount of sensitivity may be achieved by cascading such stages in well-known manner. The outputs of the radio frequency amplifiers 51, 52 are then rectified by detectors 62, 63 and 64. Two of these, 63 and 64 have their rectifiers 63$a$, 64$a$ poled in a sense to derive the negative envelope of the modulated R. F. wave, and thus, after elimination of the R. F. wave by the associated short (5 $\mu$s.) time constant circuits are derived voltages labeled $-y$ and $-x$. This indicates that the original signals $y$ and $x$ are recovered at these points, modified to the extent that their polarities are both negative, and that a variable amount of amplification has been added thereto. The third rectifier and smoothing circuit 62, 62$a$ is for the purpose of recovering $+y$, also amplied by the same amount of gain, to be utilized as described below.

Signals $-y$ and $-x$ are now transmitted through further integrating circuits 65, 66 of time constants 100 $\mu$s, in order to obtain voltages $-\bar{y}$ and $-\bar{x}$, which are the values of $-y$ and of $-x$, respectively, averaged over the time interval of one or two horizontal sweeps of the cathode beam 34 or rotations of the commutator 17, these operations being synchronous. The voltage values $-\bar{y}$ and $-\bar{x}$ are then applied to the grids of their respective RF amplifiers 51, 52 through diode rectifiers 67, 68 in order to control the amplifier gains. The gain control characteristic of each of these amplifiers is such that an increase of $-\bar{y}$ or $-\bar{x}$ reduces the gain of the corresponding amplifier. In order that this feedback may operate as desired and maintain equality between $-\bar{y}$ and $-\bar{x}$, another voltage $-$E is also introduced into the grid circuits of the RF amplifiers 51, 52 through resistors 69, 70. Through the operation of the diodes 67, 68, this has the effect of holding the amplifiers 51, 52 at full gain until the value of $-\bar{y}$ or of $-\bar{x}$, as the case may be, exceeds the value $-$E. When $-\bar{y}$ or $-\bar{x}$ begins to exceed $-$E by a very small amount, the gain of the corresponding amplifier is readjusted to a lower value. Since the gain varies sharply with small changes in grid voltage, the result is to adjust the values $-\bar{y}$ and $-\bar{x}$ very close to equality with $-$E. The conditions are now fulfilled under which the match next to be made is considered valid. This is to say the signals have been normalized in amplitude.

For optimum performance of the apparatus and in particular for optimum discrimination between instantaneous values of the standard signal $y$ and of the unknown spoken word signal $x$, it is clearly desirable that the standard signal amplifier 52 and the unknown word signal amplifier 51 and their associated circuit components such as the variolossers 55 and 56 shall operate with high signals levels though short of overload. This desideratum is conveniently met with the matching circuit of Fig. 3 by selection or adjustment of the voltage of the battery $-$E.

The voltages $+y$ and $-x$, derived as described above, are now added by way of resistors 75, 76. Since they are of opposite sign this amounts to a subtraction of $+x$ from $+y$. The difference $y-x$ is applied to the grid of a cathode follower tube 77 whose low impedance output is applied to a squaring circuit. The latter must be able to accommodate positive and negative values of the input $y-x$ equally well. Two like devices, each having a parabolic input-output characteristic, serve the purpose. Thus, two like parabolic characteristic triodes 78, 79 are provided, the cathode of one and the grid of the other being supplied with fixed voltages $+E_c$ and $-E_c$, respectively, while the input is applied to the grid of the first and to the cathode of the second in parallel. With these connections when $y-x=0$ (perfect match) the tubes 78 and 79 are both completely cut off; that is, no plate current flows, and the plate output voltages are maximum.

Now, if the input voltage $y-x$ varies positively from this perfect match the grid of the upper triode 79 is driven along its parabolic characteristic towards saturation, thus giving rise to a square law reduction in its contribution to the output voltage. If the input voltage varies negatively from the perfect match, the cathode of the lower triode 78 is driven negatively towards its grid potential which drives that tube along its parabolic characteristic toward saturation, thus producing a square law reduction in its contribution to the output voltage. The desired output characteristic is thus obtained, averaging of these squared values being obtained by a condenser 80. This output voltage is now introduced into the threshold circuit of Fig. 2, where it operates as previously described.

From the foregoing description of the matching circuit, Fig. 3, it is clear that the principal purpose served by the variable gain feature of the upper standard signal amplifier 52 and associated circuit elements such as the variolosser 56 is to reduce the average value $\bar{y}$ of the standard signal $y$ to a constant value, namely, $-$E. It is equally clear that by proper control of the process of the fabrication of the word mask 31, the distribution of its apertures will be such that, with a cathode beam 34 of constant current, the resultant signal on the target 32 will automatically have a constant value throughout the process of scanning the target at any one speed, and this constant average can be adjusted to any desired level by an amplifier of fixed gain. However, in order to permit flexibility in the adjustment of the apparatus, to compensate for any possible deviation of the standard space pattern mask 31 from its designed and intended aperture distribution, to compensate for miscellaneous deviations of the apparatus as a whole due, for example to the aging of components such as vacuum tubes, and to simplify the readjustment of the average value $\bar{y}$ which is necessitated by the scanning of the mask in the frequency direction at various speeds, it is considered preferable to include the variable gain feature in the standard signal amplifier as described above. In other words the variable gain feature of this amplifier while not essential as a matter of principle is highly desirable as a matter of practice.

The description has so far covered the normalizing mentioned earlier in respect to time, by providing an "elastic" time scale in the standard patterns; and also the normalizing in amplitudes as described in detail for the matching circuits of Fig. 2. It remains to describe the process of normalizing in respect to the frequency variations which are to be expected among various voices. This is accomplished by variations in the length of the horizontal sweep, common to all the recognizers, which is derived from the horizontal sweep control apparatus shown in Fig. 1. Here it is assumed that a linear change in the speed of the sweep across the mask 31 gives a sufficient approximation to the desired characteristic, and that three fixed sweep speeds employed in rotation provide sufficiently fine gradations for practical purposes, although non-uniform speed scans are contemplated as a refinement. In order to give the averaging circuit of the matching device time to adjust for each sweep speed, the sweep speed is maintained at one value for ten sweeps, changed to a second value and held constant for ten sweeps, and then changed to a third value and held for ten sweeps.

The sweep generator 85 is triggered once per revolution of contactor 35, thus holding it in synchronism with the commutator 17. A ten-to-one step-down circuit 86 is also triggered by the contactor 35, in such a way that one output pulse is generated for each ten input pulses. These output pulses are used to step along a conventional ring circuit 87, which applies ground to each one of its output leads in succession. The total resistance of a voltage divider 88 connected to the output terminals of the sweep generator 85 is altered in steps by the cyclic grounding of the several output terminals of the ring circuit 87 in such a way that three sweep lengths, and therefore for a given repetition rate of the sweep generator three sweep speeds are generated and applied to the horizontal deflecting elements 30 of the recognizers 18.

Figure 4:
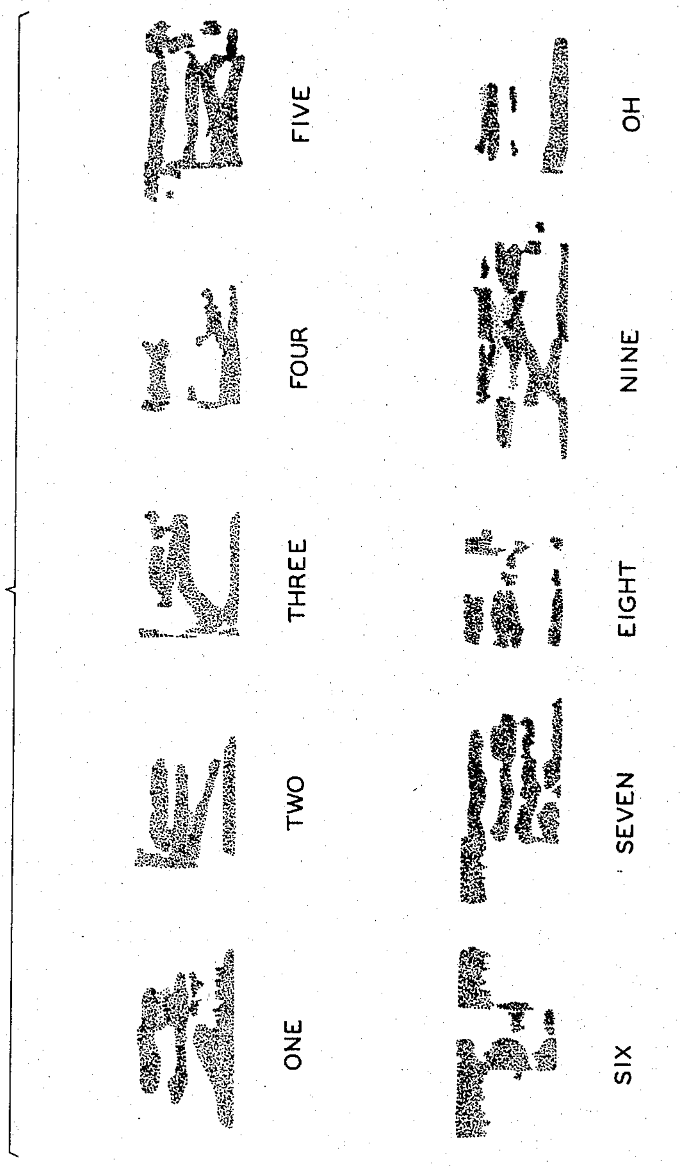
Fig. 4 is a diagram showing a set of word masks for use in the cathode beam tube of Fig. 2.

Fig. 4 shows 10 possible patterns which may be used for the fabrication of the ten perforated recognizer masks. In each of these patterns the time axis is horizontal and the frequency axis is vertical. They are given for illustrative purposes only. As the knowledge and understanding of the characteristics of speech advances, it is contemplated that still better patterns can be found for discriminating most successfully between the digits.

Various departures in detail from the apparatus described above are possible. The fact that squaring devices of construction other than the triodes of Fig. 3 are possible has already been mentioned. As another example, it may be sufficient to normalize the amplitudes not by adjusting the gains of the amplifiers until the average values of the $x$ signal and of the $y$ signal are individually equal to the same constant but rather by making them equal to each other independently of their individual values. Again, it may be desirable to carry out this normalization not in terms of the average values of the signals directly but in terms of some function of these average values. Considerable variations are also possible in the constructional details of the recognizing apparatus of Fig. 2. Thus, in place of the distributed small perforations of the mask, there may be provided slots of suitable width, whose configuration follows approximately the configuration of the regions of greatest density of apertures in the mask shown. Such a construction gives rise to output pulses on the collector plate of rectangular form. With a certain degradation in the matching, these may be matched directly with the incoming signals. As a refinement, however, the square output standard pulses may first be passed through a filter which gives them a somewhat more rounded form, thus more nearly approaching the configuration of the spoken word spectrum signal. If preferred, a slicing operation may be applied to the incoming signal itself in order that it can better be matched with the square pulse output of the slotted mask.

An optical mask and a light sensitive cell, placed outside of the tube 25 and actuated by a spot of light developed by the impact of the cathode beam 34 on a fluorescent screen may be substituted for the electron mask 31 and target 32.

While described in connection with what is believed to be one of its more important uses, namely, a telephone switching system, it is plain that many of the features and components of the invention are also applicable to other uses. It will be clear to those skilled in the art that the word recognition output, instead of establishing a voice path between two telephone subscribers may, if desired, be caused to operate some other mechanism such as the keys of a typewriter which then prints any one of a group of symbols, each of which is uniquely correlated with a spoken word.

Still other variations and modifications of the invention will occur to those skilled in the art.

What is claimed is:

1. In a voice-operated system, means for analyzing the progressive sound of a spoken word into fresuency components, means for generating a signal related to the components of an early part of a standard word as spoken by a reference voice, means for modifying said signal in relation to various individual voices, means for balancing said signal against the components of said spoken word to provide a match signal when a balance is obtained, means under control of said match signal for advancing in time the part of the standard word to which said generated signal is related, and means controlled by persistence of said match signal throughout the course of said advance to the final part of said standard word for generating an identification signal.

2. In a voice-operated system, means for analyzing the progressive sound of a spoken word into frequency components, means for generating a signal related to the components of an early part of a standard word as spoken by a reference voice with a reference frequency distribution, means for modifying said reference component signal in relation to the frequency-distributions of various individual voices, means for balancing said reference component signal against the components of said spoken word to provide a match signal when a balance is obtained, means under control of said match signal for advancing in time the part of the standard word to which said generated signal is related, and means controlled by persistence of said match signal throughout the course of said advance to the final part of said standard word for generating an identification signal.

3. In a voice-operated system, means for analyzing each of a plurality of successive samples of the sound of a spoken word into a spectrum, the successive spectra differing from each other as the word proceeds, means for generating a signal corresponding to the spectrum of an initial part of a standard word as spoken by a reference voice, means for modifying said signal in relation to various individual voices, means for balancing said signal against the spectrum of the first sample of said spoken word to provide a match signal when a balance is obtained, means under control of said match signal for advancing in time the part of the standard word to which said generated signal is related, thereby permitting a balance to be effected between the generated signal corresponding to a subsequent part of said standard word and an ensuing word sample spectrum, and means controlled by persistence of said match signal to the final part of said standard word for generating an identification signal.

4. In a voice-operated system, means for analyzing the progressive sound of a spoken word into frequency components, the distribution of said components changing continuously, a cathode beam tube having an electron gun, a target, and a mask pierced by apertures which are distributed in related conformance with the distribution of the frequency components of a standard word as spoken by a reference voice at standard speed, means for sweeping the beam over the mask at varying rates to generate a succession of target signals related to the frequency components of a part of the standard word as spoken by various voices at standard speed, means for balancing said target signals against the frequency components of said spoken word, means controlled by said balancing means for advancing said beam along said mask from a start position toward a finish position when a relatively close balance is obtained, means responsive to severe unbalance for restoring said beam to its start position, and means responsive to arrival of said beam at its finish position for indicating said arrival.

5. In combination with apparatus defined in claim 4, means responsive to arrival of the beam at its finish position for restoring it to its start position.

6. In a voice-operated system, means for generating an energy beam, a mask disposed in the path of said beam, said mask having a transmissivity for the energy of said beam which varies in one direction along said mask in proportion to the variation with frequency of the energy of the spectrum of a standard word as spoken by a reference voice and which varies in another direction in proportion to the time variation of a particular frequency component of said spectrum as the speaking of said word proceeds, means for deflecting said beam to scan said mask in the frequency direction at a controllable speed, means for advancing said beam in the time direction along said mask at a controllable speed, means for deriving a signal from the scanning of said mask by said beam, means for deriving the spectrum of a spoken word, means for balancing said spectrum against said signal, and means under control of said balancing means for accelerating the advance of said beam along said mask when a balance is obtained.

7. In a voice-operated system, means for generating an energy beam, a mask disposed in the path of said beam, said mask having a transmissivity for the energy of said beam which varies in one direction along said mask in proportion to the variation of the frequency of the spectrum of a standard word as spoken by a reference voice and which varies in another direction in proportion to the time variation of a particular frequency component of said spectrum as the speaking of said words proceeds, means for deflecting said beam to scan said mask in the frequency direction at a controllable speed, means for advancing said beam in the time direction along said mask at a controllable speed, means for deriving a signal from the scanning of said mask by said beam, and means controlled by a characteristic of said signal for controlling said advancing speed to normalize said signal.

8. In a voice-operated system, a plurality of space patterns, each representative of a sequence of spectra of one of a group of standard words constituting a vocabulary, means for scanning said patterns to derive a plurality of standard word spectra, means for deriving the spectrum of a spoken word, means for balancing said spoken word spectrum against said standard word spectra to provide a match signal when a balance with one of said spectra is obtained, and means controlled by said match signal for generating an identification signal.

9. In combination with apparatus as defined in claim 8, means controlled by said match signal for recommencing the scanning of all of said patterns.

10. In a voice-operated system, a plurality of space patterns, each representative of a sequence of spectra of one of a group of standard words constituting a vocabulary, means for scanning each of said patterns at various speeds to derive a plurality of standard word spectrum signals representative of a standard word as spoken by voices of different frequency characteristics, means for deriving the spectrum of a spoken word, means for balancing said spoken word spectrum against said standard word spectra to provide a match signal when a balance with one of said spectra is obtained, and means controlled by said match signal for generating a signal which identifies the spoken word.

11. In a voice-operated system, a space pattern representative of the spectrum of a standard word, means for scanning said pattern at various speeds to derive signals representing the spectrum of a part of said standard word as pronounced with various frequency characteristics, means for deriving from a spoken word a signal representing the spectrum of a corresponding part of said spoken word, means for balancing said spoken word spectrum signal against each of said standard word spectrum signals to provide a match signal when a balance is obtained, and means controlled by said match signal for advancing the part of the space pattern scanned.

12. In a voice-operated system, a space pattern representative of the spectrum of a standard word, means for scanning said pattern at various speeds to derive signals representing the spectrum of a part of said standard word as pronounced with various frequency characteristics, means for deriving from a spoken word a signal representing the spectrum of a corresponding part of said spoken word, means for balancing said spoken word spectrum signal against each of said standard word spectrum signals to provide a match signal when a balance is obtained, means controlled by said match signal for advancing the part of the space pattern scanned, and means controlled by advance of said pattern part to a preassigned region of said pattern for generating an identification signal.

13. In a voice-operated system, a space pattern representative of the spectrum of a standard word, means for scanning said pattern at various speeds to derive signals representing the spectrum of a part of said standard word as pronounced with various frequency characteristics, means for deriving from a spoken word a signal representing the spectrum of a corresponding part of said spoken word, means for balancing said spoken word spectrum signal against each of said standard word spectrum signals to provide a match signal when a balance is obtained, means controlled by said match signal for advancing the part of the space pattern scanned, and means controlled by advance of said pattern part to a preassigned region of said pattern for generating an identification signal and for recommencing the scanning of said pattern.

14. In a voice-operated system, a plurality of space patterns, each representative of a sequence of spectra of one of a group of standard words constituting a vocabulary, means for repeatedly scanning said patterns to derive a plurality of signals each representing the spectrum of a part of one of said standard words, means for deriving a signal representing the spectrum of a corresponding part of a spoken word, means for balancing said spoken word spectrum signal against said standard word spectrum signals to derive a matching signal when an instantaneous balance is obtained, means controlled by said matching signal for advancing the scanning of that pattern from the scannnig of which the instantaneously balancing signal was derived, means for generating a final match signal when a final balance with one of said spectra is obtained, and means controlled by said final match signal for generating a signal which identifies the spoken word.

15. In a voice-operated system, a plurality of space patterns, each representative of a sequence of spectra of one of a group of standard words constituting a vocabulary, means for repeatedly scanning said patterns to derive a plurality of signals each representing the spectrum of a part of one of said standard words, means for deriving a signal representing the spectrum of a corresponding part of a spoken word, means for balancing said spoken word spectrum signal against said standard word spectrum signals to derive a matching signal when an instantaneous balance is obtained, means controlled by said matching signal for advancing the scanning of that pattern from the scanning of which the instantaneously balancing signal was derived, means for generating a final match signal when a final balance with one of said spectra is obtained, and means controlled by said final match signal for generating a signal which identifies the spoken word and for recommencing the scanning of all of said patterns.

16. In a voice-operated system, a space pattern representative of the spectrum of a standard word, means for repeatedly scanning said pattern to derive a signal representing the spectrum of a part of said standard word, means for deriving from a spoken word a signal representing the spectrum of a corresponding part of said spoken word, means for balancing said spoken word spectrum signal against said standard word spectrum signal to derive a match signal when a balance is obtained, and means controlled by said match signal for advancing the part of the space pattern scanned.

17. In a voice-operated system, a space pattern representing successive spectra of a standard word, means for scanning a part of said pattern to derive a signal related to an instantaneous spectrum of the standard word, means for varying the scanning speed to modify said signal in relation to the frequency characteristics peculiar to an individual voice, means for altering the part of the pattern scanned in relation to the progress of a spoken word, means for deriving the spectra of successive parts of a spoken word, means for balancing said spectra against said signals to provide a match signal when a balance is obtained, and means controlled by said match signal for advancing the part of the pattern which is scanned in relation to the progressive differences among the spectra of the spoken word.

18. In a voice-operated system, means for continuously deriving a signal indicative of the frequency distribution of the energy of a spoken word, means for regularly deriving samples of said signal at a succession of regular sampling instants, means for generating a second signal indicative of the frequency distribution of the energy of an instantaneous sample of a standard word as spoken by a reference voice at a standard speed, said sample being taken at a controlled instant, means for modifying said second signal in relation to the altered frequency distribution of the energy of said instantaneous sample of said standard word as spoken by other voices at standard speed, means for balancing each sample of the first signal against said second signals, and means under control of said balancing means for advancing the sampling instant of said second signal when a balance is obtained.

19. In a voice-operated system, means for analyzing the progressive sound of a spoken word into component signals, means for generating signals related to the corresponding components of a standard word, two similar amplifiers, each having input terminals, two output paths, and a gain control electrode, connections for applying the spoken word component signals to the input terminals of one amplifier, connections for applying the standard word component signals to the input terminals of the other amplifier, an averaging device in the first output path of each amplifier for deriving the average output signal of that amplifier, connections for applying the average output signal of each amplifier to the gain control terminal of that amplifier in a degenerative sense to hold said average output signals individually at a preassigned level, means for deriving a signal proportional to the difference of the signals in the second output paths of the two amplifiers, means for evaluating said difference signal, and means controlled by said evaluating means for generating an identification signal when said difference signal lies continuously below a preassigned level for the duration of the spoken word.

20. Apparatus as defined in claim 19 wherein the difference-signal-evaluating means includes an element having a square law characteristic.

21. In a voice-operated system, means for analyzing the progressive sound of a spoken word into component signals, the distribution of said component signals changing continuously, means for generating signals related to the components of an initial part of a standard word as spoken by a reference voice, two similar amplifiers, each having input terminals, two output paths, and a gain control electrode, connections for applying the spoken word component signals to the input terminals of one amplifier, connections for applying the standard word component signals to the input terminals of the other amplifier, an averaging device in the first output path of each amplifier for deriving the average output signal of that amplifier, connections for applying the average output signal of each amplifier to the gain control electrode of that amplifier in a degenerative sense to hold said average output signals individually at a preassigned level, connections for deriving a signal proportional to the difference of the signals in the second output paths of the two amplifiers, means for evaluating said difference signal, means controlled by said evaluating means for advancing the part of said standard word to which said generated component signals are related when said difference signal falls below a preassigned level, and means controlled by the advance of said standard word to its final part for generating a signal which identifies the spoken word.

22. Apparatus as defined in claim 21 wherein the difference-signal-evaluating means includes an element having a square law characteristic.

KINGSBURY H. DAVIS.
RALPH K. POTTER.

REFERENCES CITED

The following references are of record in the file of this patent:

UNITED STATES PATENTS

| Number | Name | Date |
|---|---|---|
| 2,151,091 | Dudley | Mar. 21, 1939 |
| 2,233,487 | Robertson | Mar. 4, 1941 |
| 2,238,555 | Dudley | Apr. 15, 1941 |
| 2,293,203 | Gosmann | Aug. 18, 1942 |
| 2,397,830 | Bailey | Apr. 2, 1946 |